United States Patent [19]

Takemoto

[11] 4,227,219
[45] Oct. 7, 1980

[54] CARRIAGE GUIDE MECHANISM FOR USE IN SCANNING DEVICE

[75] Inventor: Takeshi Takemoto, Yokohama, Japan

[73] Assignee: Ricoh Company, Ltd., Tokyo, Japan

[21] Appl. No.: 943,939

[22] Filed: Sep. 19, 1978

[30] Foreign Application Priority Data

Sep. 23, 1977 [JP] Japan .................................. 52-114414
Jul. 30, 1978 [JP] Japan .................................. 53-93010
Jul. 30, 1978 [JP] Japan .................................. 53-93011

[51] Int. Cl.² .............................................. H04N 1/06
[52] U.S. Cl. ................................ 358/289; 346/139 D; 346/140 R; 358/293
[58] Field of Search ....................... 356/285, 289, 293; 346/139 A, 139 B, 139 C, 139 D, 140 A, 140 R

[56] References Cited

U.S. PATENT DOCUMENTS

| | | | |
|---|---|---|---|
| 2,615,780 | 10/1952 | Cooley | 346/139 C |
| 2,806,081 | 9/1957 | Ridings et al. | 358/289 |
| 3,739,384 | 6/1973 | Harkins | 346/139 B |
| 3,795,766 | 3/1974 | Farlow | 358/289 |
| 4,045,802 | 8/1977 | Fokazawa et al. | 346/140 R |
| 4,144,537 | 3/1979 | Kimura et al. | 346/140 R |

FOREIGN PATENT DOCUMENTS 19976 of 1888 United Kingdom ................ 346/140 R
1113424 5/1968 United Kingdom ................ 346/139 B Primary Examiner—Robert L. Griffin
Assistant Examiner—Joseph A. Orsino, Jr.
Attorney, Agent, or Firm—Burgess, Ryan and Wayne

[57] ABSTRACT

A carriage guide mechanism for use in a scanning device wherein in order to facilitate the maintenance and repair of an image reading or recording head such as an ink jet head, carriage guide means are so arranged as to permit the head to move away from a drum. In one embodiment, a first guide means is extended through a carrier in such a manner that the latter may be rotated about the first guide means in either direction. Normally the carriage is biased so as to make direct or indirect contact with a second guide means, but it may be manually or automatically swung away so that the head may be moved away from the drum. In another embodiment, the first and second guide means are supported at their ends by supporting frame one end of which is pivoted with a vertical pivot pin to a drum supporting frame so that the carriage may be moved away from the drum.

2 Claims, 16 Drawing Figures

CARRIAGE GUIDE MECHANISM FOR USE IN SCANNING DEVICE

BACKGROUND OF THE INVENTION

The present invention relates to a carriage guide mechanism especially adapted for use with a scanning type information processing device of the type wherein an image reading head or an image recording head is reciprocated along a rectilinear path in parallel with a drum around which is wrapped an original or a recording medium and is spaced apart from the drum by a predetermined distance.

A prior art carriage guide mechanism of the type described above comprises in general a head carriage by a lead screw and guided by a guide bar. The lead screw and the guide bar are extended through the head carriage in parallel with the axis of the drum and are supported at their ends by supporting frames which also support the drum. Alternatively, the carriage is guided by first and second guide bars in a manner substantially similar to that described above. The carriage is displaced in either direction along the lead screw and the guide bar or along the first and second guide bars so as to scan the information bearing medium or the recording medium wrapped around the drum in the axial direction thereof. However, even a slight lack of parallelism between the two guide means and/or twists or torsions thereof result in the unsmooth movement of the carriage which in turn causes the variation on a driving system. As a result, the variation in speed of the head occurs so that the correct reading or recording cannot be accomplished. In the case of recording, the recorded images are degraded with fringe patterns.

In order to attain a high parallelism between the two guide means, they must be manufactured to the very close tolerances and assembled with the supporting frames also with the very severe tolerances. As a result, the manufacturing cost as well as the assembly cost are considerably increased.

Furthermore, since the two guide means are extended through the carriage, the latter cannot be swung away from the drum. In other words, the distance between the carriage and the drum which is very small remains unchanged over the whole length of the drum so that it is very inconvenient to make the inspection, maintenance and replacement of the head in such small space between the carriage and the drum.

SUMMARY OF THE INVENTION

One of the objects of the present invention is therefore to provide a carriage guide mechanism for a scanning type information processing device which may substantially overcome the problems encountered in the prior art guide mechanisms, have high productivity and facilitate the inspection, maintenance, repair or replacement of an image reading or recording head mounted on the carriage.

According to preferred embodiments of the present invention, a lead screw or a first guide bar is extended through a carriage in such a way that the latter may not only rotate about the lead screw or the first guide bar in either direction but also be displaced therealong in either direction. A second guide bar is provided in parallel with the lead screw or the first guide bar and spaced apart therefrom by a predetermined distance. The carriage is normally so biased as to be pressed against this second guide bar directly or through a guide roller. Thus when the carriage is displaced in either direction, it is guided by the lead screw and the second guide bar or by the first and second bars and may be swung about the lead screw or the first guide bar away from the drum against the biasing force to the inoperative or retracted position where the inspection, maintenance, cleaning or replacement of the head may be easily made.

According to one preferred embodiment of the present invention, a whole carriage guide mechanism including a driving device may be swung about a vertical axis away from the drum for the inspection, maintenance, cleaning or replacement of the head.

Opposed to the prior art carriage guide mechanisms, only the lead screw or the first guide bar is extended through the carriage so that a high parallelism between the lead screw or the second guide bar or between the first and second guide bar is not required so that the assembly may be much facilitated.

Furthermore, in the case of the carriage guide mechanism of the type which may be swung away from the drum, the lead screw and the first guide bar both of which are extended through the carriage are supported at their both ends by the supporting frames separated from the drum frames. This means that when the supporting frames are formed, the holes for supporting the lead screw and the first guide bars are also formed so that the assembly may be further facilitated.

PRIOR ART

Figure 1:
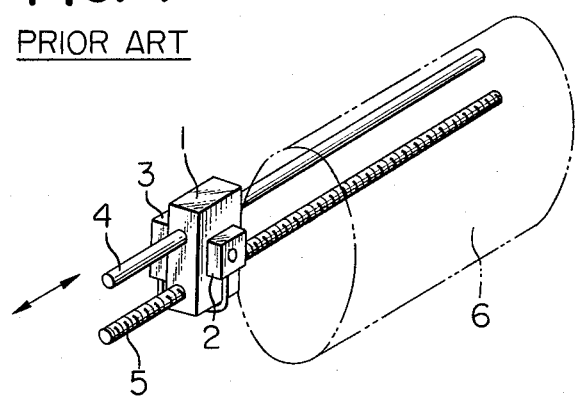
FIG. 1 is a schematic perspective view of a prior art carriage guide mechanism.

FIG. 1 shows a prior art scanning mechanism for an ink jet recording device comprising a carriage 1, an ink jet head 2, an ink tank 3, a guide bar 4, a lead screw 5 and a drum 6 around which is wrapped a recording sheet. When the lead screw 5 is rotated in either direction, the carriage is moved in the directions indicated by the double-pointed arrow.

Figure 2:
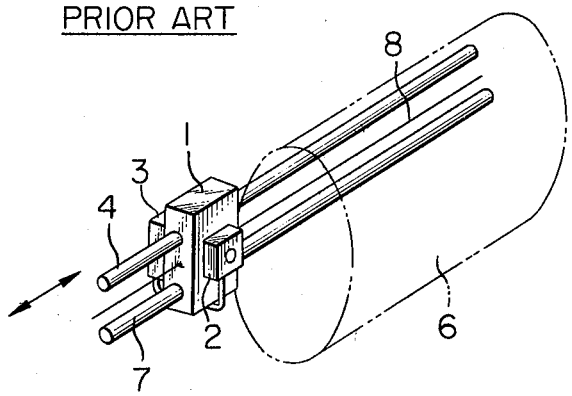
FIG. 2 is a schematic perspective view of another prior art carriage guide mechanism.

In another prior art mechanism shown in FIG. 2, the carriage 1 is mounted on a guide bar 7 instead of the lead screw 5 and connected to driving wires 8.

In either case the carriage 1 is guided by two guide members so that if the latter are not correctly in parallel with each other and are twisted, the smooth movement of the carriage 1 cannot be obtained, resulting in the variation on load on a driving device. In general the carriage 1 is mounted on the guide bars 4 and 7 through bearings, but even a slight deviation from the true parallelism between the guide bar 4 and the guide bar 7 or the lead screw 5 and even very small twists of them still cause the variation in load. It is very important for the scanning mechanisms that there is no variation in speed. Otherwise the recorded images have fringe patterns in case of a recording device. When the guide bar 4 and the lead screw 5 or the guide bar 7 are correctly positioned relative to the carriage 1 within allowable tolerances, the variation in position of the ink jet head relative to the recording paper on the drum 6 may be minimized so that the distance between the nozzle hole of the ink jet head 2 and the recording paper may be stabilized. However, even a slight deviation from the true parallelism between the guide bar 4 and the lead screw 5 or the guide bar 7 and even very small twists of them cause the variation in sliding resistance of the carriage 1, resulting in the variation in load and scanning speed as described above. In order to attain the true parallelism and eliminate twists, the guide bars and lead screws must be manufactured to very close tolerances.

The prior art scanning mechanism of the types described above has another problem that since two guide members must be extended through the carriage 1, their adjustment in assembly requires a long time. A further problem is that the presence of the carriage 1 interferes with the feeding and discharge of the original and recording sheet. A still further problem is that in case of the inspection, maintenance and replacement of the head the carriage 1 cannot be removed from the drum 6.

Figure 3:
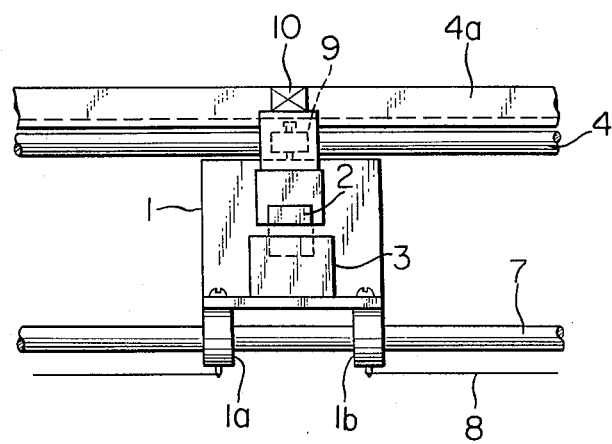
FIG. 3 is a front view of a first embodiment of a carriage guide mechanism in accordance with the present invention.
Figure 4:
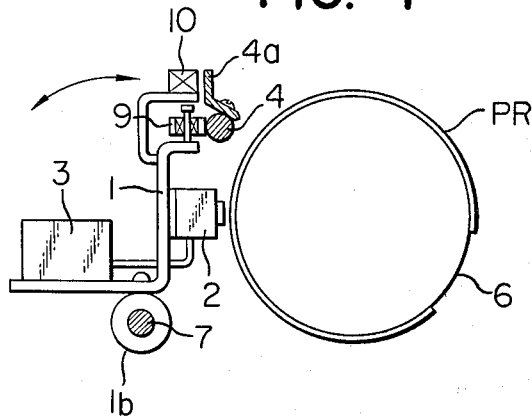
FIG. 4 is a right side view thereof.

DESCRIPTION OF THE PREFERRED EMBODIMENTS:

First Embodiment, FIGS. 3 and 4

Referring to FIGS. 3 and 4, reference numeral 7 denotes a first guide bar; 9, a guide roller mounted on the carriage 1; 4, a second guide bar; and 10, a rotation moment imparting means or a permanent magnet 10. The carriage 1 is supported by a pair of spaced guide rollers 1a and 1b with bearings which in turn are slidably fitted over the first guide bar 7. The carriage 1 is also rotatable about the first guide bar 7. A steel plate 4a is attached to the second guide bar 4 over the whole length thereof in opposed relationship with the permanent magnet 10 mounted on the carriage 1. In the operative position shown in FIG. 4, the ink jet head 2 is in opposed relationship with a recording sheet PR partly wrapped around the drum 6 and the permanent magnet 10 attracts the steel plate 4a so that the carriage 1 is imparted with the rotation moment in the clockwise direction and consequently the guide roller 9 is pressed against the second guide bar 4. When the carriage 1 is displaced by the driving wire 8 in the right or left direction in FIG. 3, the guide roller 9 which is pressed against the second guide bar 4 as described above is in rolling contact with the bar 4. Thus the movement of the carriage 1 is very smooth, causing no variation in load.

When the carriage 1 is rotated in the counterclockwise direction about the first guide bar 7 against the attracting force of the permanent magnet 10, the ink jet head 2 is moved away from the drum 6 so that the recording sheet PR may be easily wrapped around the drum 6 or removed therefrom and the inspection, maintenance and cleaning may be much facilitated.

The first and second guide bars are shown as being circular in cross section in FIG. 4, but it will be understood that they may have any suitable cross sections. For instance they may be polygonal or rectangular in cross section. When the second guide bar 4 is made of a ferromagnetic material, a pair of permanent magnets may be mounted on the carriage on both sides of the guide roller 9 and the permanent magnet 10 and the steel plate 4a may be eliminated. Instead of the permanent magnet 10, an electromagnet may be used.

Figure 5:
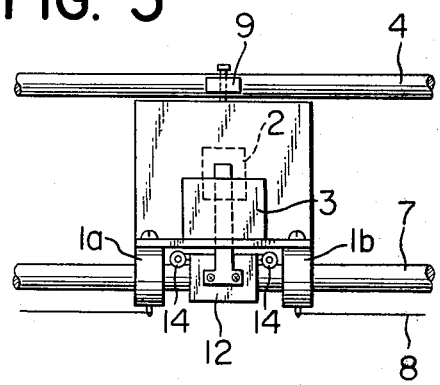
FIG. 5 is a front view of a second embodiment of the present invention.
Figure 6:
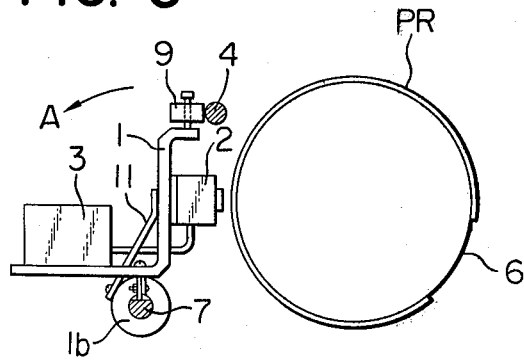
FIG. 6 is a right side view thereof.
Figure 7:
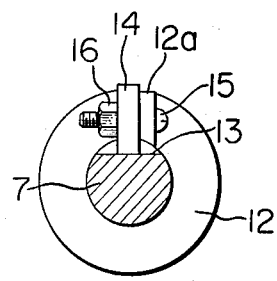
FIG. 7 is a fragmentary view, on enlarged scale, thereof illustrating the arrangement of a cylindrical member and a guide roller.

Second Embodiment, FIGS. 5, 6 and 7

In the second embodiment shown in FIGS. 5, 6 and 7, instead of the permanent magnet 10 of the first embodiment, a leaf spring 11 is used as rotation moment imparting means. One end of the leaf spring 11 is securely fixed to the outer cylindrical surface of a cylindrical member 12 while the other end thereof is pressed against the surface of the carriage 1 opposite to the surface of which is mounted the ink jet head 2. The cylindrical member 12 is loosely fitted over the first guide bar 7 between a pair of guide rings 1a and 1b.

Referring particularly to FIG. 7, the first guide bar 7 has a flat horizontal surface 13 upon which ride a pair of guide rollers 14. The guide roller 14 is rotatably mounted with a bolt 15 and a nut 16 on a projection 12a which is extended from the cylindrical member 12 in parallel with the axis thereof. The pair of guide rollers 14 serve to prevent the rotation of the cylindrical member 12 about the first guide bar 7. The cylindrical member 12 is pushed by the guide roller 1a or 1b and displaced in unison with the carriage 1.

Referring to FIGS. 5 and 6 again, the leaf spring 11 normally biases the carriage 1 to rotate in the clockwise direction in FIG. 6 so that the guide roller 9 may be pressed against the second guide bar 4. Thus the distance between the nozzle hole of the ink jet head 2 and the drum 6 remains unchanged. The smooth movement of the carriage may be ensured. The carriage 1 may be swung about the first guide bar 7 in the counterclockwise direction in FIG. 6 away from the drum 6 as indicated by the arrow A.

Figure 8:
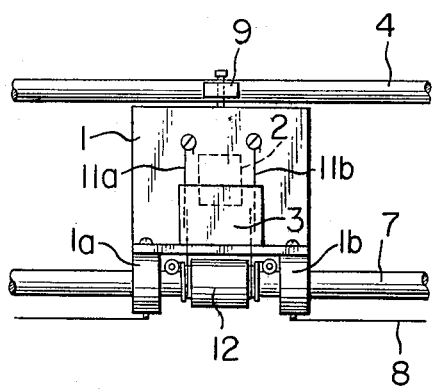
FIG. 8 is a front view of a third embodiment of the present invention.
Figure 9:
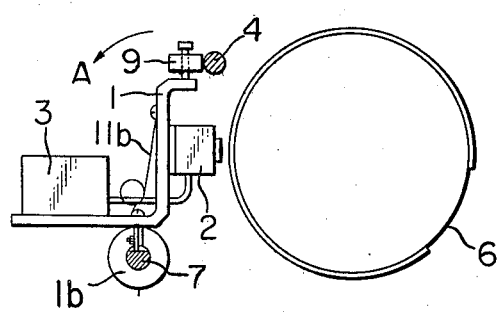
FIG. 9 is a right side view thereof.

Third Embodiment, FIGS. 8 and 9

The third embodiment shown in FIGS. 8 and 9 is substantially similar in construction to the second embodiment described above except that instead of one leaf spring 11, two cylindrical helical springs 11a and 11b of circular cross section with a very small diameter are used to bias the carriage 1. One ends of the springs 11a and 11b are securely fixed to the carriage 1 while the other ends to the cylindrical member 12.

As described above, according to the first, second and third embodiments of the present invention, the carriage 1 is mounted on the first guide bar 7 both for rotation thereabout and for sliding movement therealong and is imparted with the biasing force so that the guide roller 9 may be pressed against the second guide bar 4 into rolling contact therewith. Therefore no variation in load will occur during the movement of the carriage 1 due to a slight deviation from a true parallelism between the first and second guide bars 7 and 4 and due to the twists thereof so that the smooth movement of the carriage 1 may be ensured. Moreover the carriage 1 may be rotated about the first guide bar 7 between the operative position and the inoperative position where the ink jet head 2 is moved away from the drum 6 so that the inspection maintenance and replacement of the head as well as the wrapping and removal of a recording sheet PR may be much facilitated.

Figure 10:
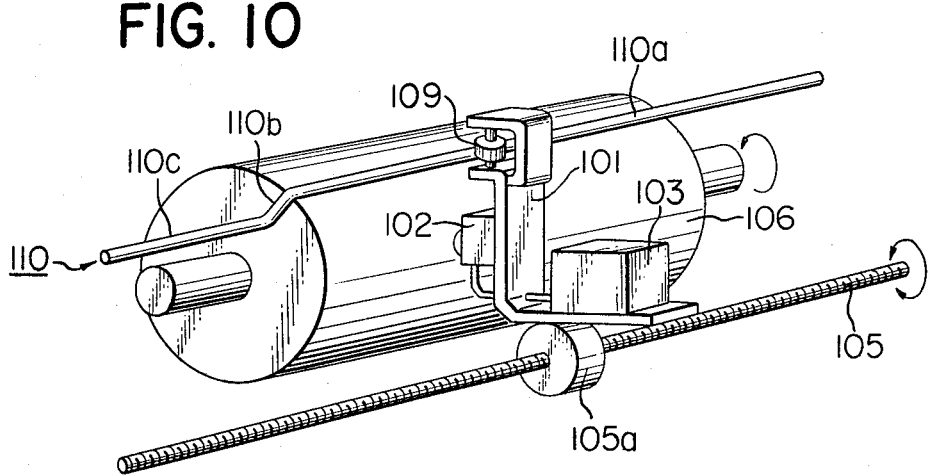
FIGS. 10 and 11 are perspective views of a fourth embodiment of the present invention illustrating a carriage in the operative position and in the inoperative position, respectively.
Figure 11:
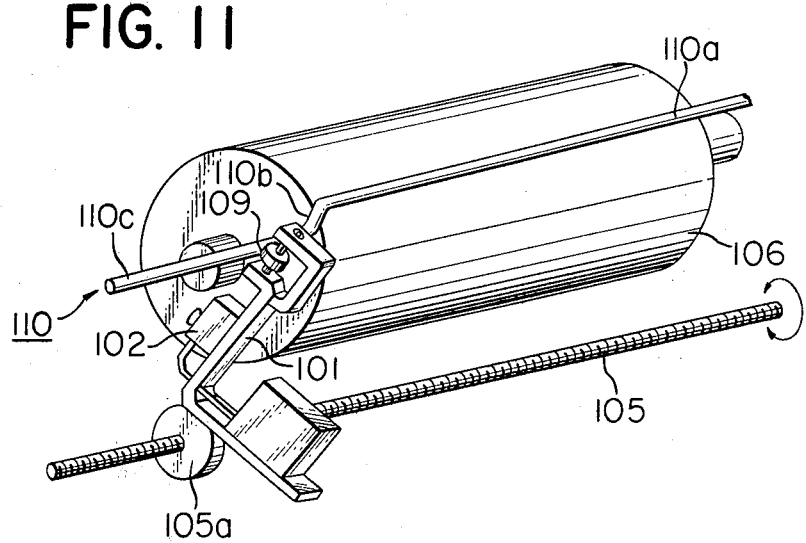

Fourth Embodiment, FIGS. 10 and 11 P Referring to FIGS. 10 and 11, a carriage 101 has a guide roller 109 consisting of a bearing (not shown) rotatably carried by a shaft and a permanent magnet ring securely fitted over the bearing. A second guide bar 110 made of a ferromagnetic material consists of an operative or scanning section 110a and an inoperative or retracted section 110c connected to the operative section 110a through a curved section 110b which is so gradually curved radially outwardly of the axis of the drum 106 that the smooth rolling contact of the guide roller 109 with the curved section 110b may be ensured. Thus the inoperative section 110c is more spaced apart from the axis of the drum 106 than the operative section 110a.

The carriage 101 is carried through a nut 105a by a lead screw 105 which is a first guide bar so that when the lead screw 105 is rotated, the carriage 101 is displaced in either direction. When the carriage 101 is displaced along the operative section 110a of the second bar 110 as shown in FIG. 10, the ink head 102 on the carriage 101 is in the operative or recording position wherein the ink jet head 102 may be activated so as to direct the jet of ink toward the recording sheet on the drum 106.

When the carriage 101 is displaced beyond the left end of the drum 106 in FIG. 11, the guide roller 109 rolls along the curved section 110b and then along the inoperative section 110c so that the carriage 101 and hence the ink jet head 102 are moved away from the drum 106 as shown in FIG. 11. With the carriage 101 in the retracted position, the inspection, cleaning and replacement of the ink jet head 102 may be easily effected.

Figure 12:
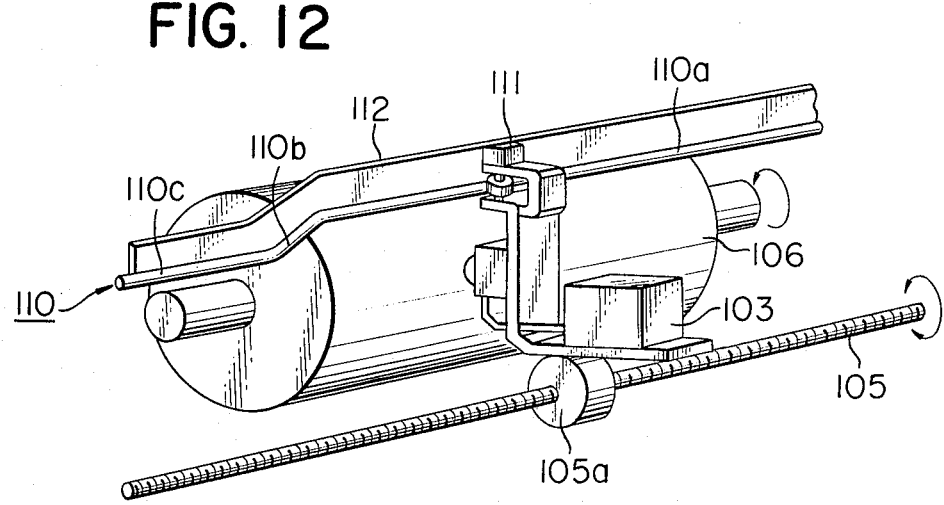
FIG. 12 is a perspective view of a fifth embodiment of the present invention.

Fifth Embodiment, FIG. 12

The fifth embodiment shown in FIG. 12 is substantially similar in construction to the fourth embodiment described above except that a permanent magnet 111 and a magnetic plate 112 are added and that instead of the permanent magnet guide roller 109 a conventional non-magnetic guide roller 109a is used. The magnetic plate 112 is attached to the second bar 110 substantially over the whole length thereof and the permanent magent 111 is mounted on the carriage 101 above the guide roller 109a and is spaced apart from the magnetic plate 112 by a small distance. Since the permanent magnet 111 and the magnetic plate 112 attract each other, the guide roller 109a is always pressed against the second guide bar 110.

It will be understood that instead of the magnetic plate 112, a non-magnetic plate may be used and that instead of the permanent magnet guide roller 109 or the permanent magnet 111, a leaf spring or cylindrical helical springs may be used for biasing the guide roller 109 so as to press it against the second guide bar 110 as described in connection with the second and third embodiments (See FIGS. 5, 6, 8 and 9).

Figure 13:
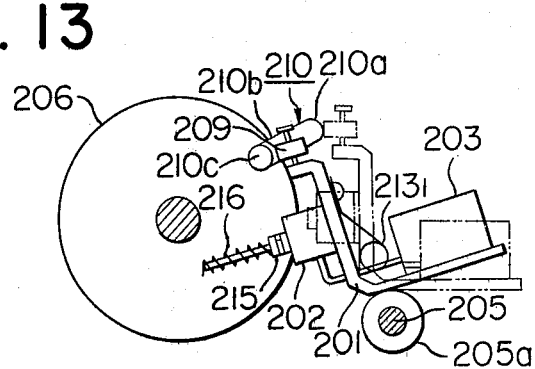
FIG. 13 is a left side view of a sixth embodiment of the present invention.

Sixth Embodiment, FIG. 13

The sixth embodiment shown in FIG. 13 is substantially similar in construction to the fourth embodiment described elsewhere in connection with FIGS. 10 and 11 except that the ink jet head 202 may be brought to a position where the head 202 may be hermetically sealed for avoiding the evaporation of ink when the recording device is not used.

The second guide bar 210 consists of the operative or recording section 210a substantially similar in arrangement to the operative section 110a of the fourth embodiment and a rest section 210c connected to the operative section 210a through the curved section 210b which, in opposition to the curved section 110b of the fourth embodiment, is gradually curved radially inwardly of the axis of the drum 206. Therefore the rest section 210c is less spaced apart from the axis of the drum 206 than the operative section 210a and consequently when the guide roller 209 passes past the left end of the drum 206 and rolls along the curved section 210b and the rest section 210c the carriage 201 is caused to swing about the first bar-lead screw 205 toward the extended axis of the drum 206 as indicated by the full lines in FIG. 13.

At this rest position the ink jet head 202 is sealed with an air-tight cap 215 which is axially slidably mounted on a stationary member of the recording device and normally biased toward the rest section 210c of the second guide bar 210 under the force of a bias spring 216. The open end of the air-tight cap 215 is pressed against the faceplate of the ink jet head 202 under the force of the bias spring 216 when the ink jet head 202 is inserted into the cap 215 against the spring 216 so that the evaporation of ink from the nozzle of the ink jet head 202 may be avoided.

When the guide roller 209 rides on the operative section 210a of the second guide bar 210, the carriage 201 is in the position indicated by the two-dot chain lines and the ink jet head 202 is in the operative or recording position relative to the drum 206.

As in the case of the fourth embodiment, the sixth embodiment may be provided with the inoperative or retracted section of the second guide bar 210c on the left side of the drum 206 so that the carriage 201 may be swung away from the drum 206 for inspection, maintenance and replacement of the ink jet head 202.

Figure 14:
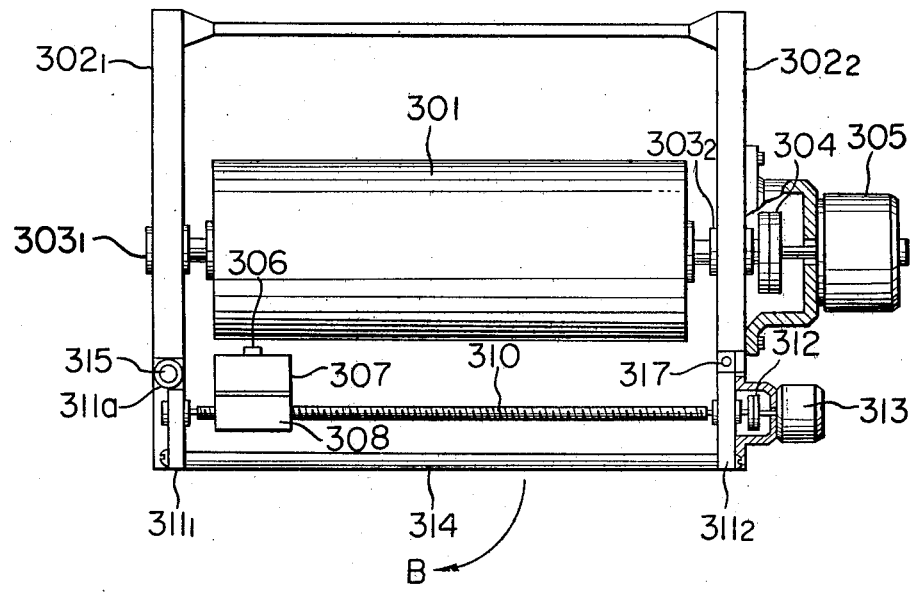
FIG. 14 is a top view of a seventh embodiment of the present invention.
Figure 15:
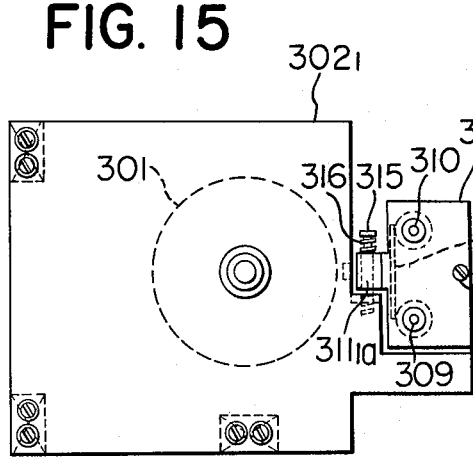
FIGS. 15 and 16 are left and right side views thereof, respectively.
Figure 16:
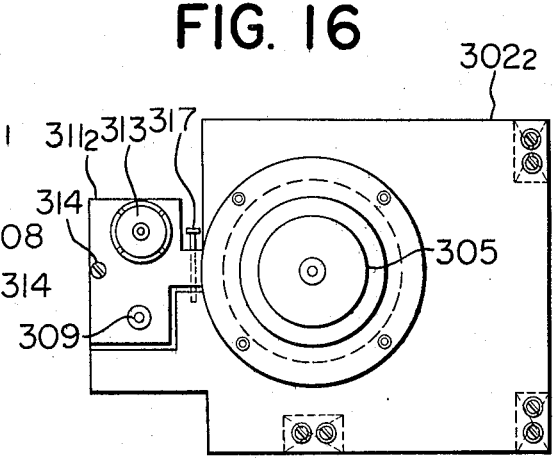

Seventh Embodiment, FIGS. 14, 15 and 16

Referring to FIGS. 14–16, the drum 301 is supported through bearings $303_1$ and $303_2$ by supporting frames $302_1$ and $302_2$. The shaft of the rotary drum 301 is connected through a coupling 304 to the drive shaft of a main scanning motor 305. An ink jet head 306 and an ink tank 307 are mounted on the carriage 308 which in turn is guided by a first guide bar 309. A lead screw 310 which is extended in parallel with and vertically spaced apart from the first guide bar 309 is screwed into the carriage 308 so that upon rotation of the lead screw 310 the carriage 308 may be displaced in either direction. The first guide bar 309 is securely supported by the supporting frames $311_1$ and $311_2$ while the lead screw 310 is supported by them through bearings (not shown). One end (the right end in FIG. 14) of the lead screw 310 is connected through a coupling 312 to the drive shaft of an auxiliary scanning motor or a carriage driving motor 313. In addition to the first guide bar 309 and the lead screw 310, the supporting frames $311_1$ and $311_2$ are securely connected to each other with a brace 314. The left-side supporting frames $311_1$ is pivoted to the supporting frame $303_1$ with a pivot pin or a bolt 315 which extends through a vertical through hole formed through a hub $311_{1a}$ into a hole formed in the supporting frame $302_1$ as best shown in FIG. 15. A spring 316 is loaded so as to impart pressure to the upper surface of the hub $311_{1a}$. Referring particularly to FIG. 16, the supporting frames $302_2$ and $311_2$ have mating projections which extend toward each other and a vertical through hole is formed through the projection of the supporting frame $311_2$ while a blind hole is formed in the projection of the supporting frame $302_2$. These through and blind holes are in line with each other when the projections are engaged as shown in FIG. 16. Normally a locking pin 317 is inserted through the through hole into the blind hole so that the supporting frame $311_2$ is normally locked in position relative to the supporting frame $302_2$ as shown.

In order to move the carriage 306 for the inspection, cleaning or replacement of the ink jet head 306, the locking pin 317 is pulled off and the ink jet head guide and drive assembly consisting of the supporting frames $311_1$ and $311_2$, the first guide bar 309, the lead screw 310, the brace 314, the carriage 308 and the motor 313 including the coupling 312 is swung about the pivot pin 315 in the direction indicated by the arrow B in FIG. 14 away from the drum 301. Since the ink jet head 306 is swung about the vertical axis of the pivot pin 315, any inclination of the nozzle thereof relative to the horizontal may be avoided and the nozzle is directed toward the supporting frame $302_2$ in the retracted position.

After the inspection, cleaning or replacement of the ink jet head, the ink jet head guide and drive assembly is swung back to the initial position in the direction opposite to that indicated by the arrow and the locking pin 317 is inserted into the holes of the frames $311_2$ and $302_2$ as shown in FIG. 16. Thus the ink jet head 306 is brought back again to the operative position.

Instead of the locking pin 317, magnetic locking means, screw locking means, a ball stopper or any other suitable locking means may be used. Furthermore, instead of the lead screw 310, a wire drive system may be used for displacing the carriage 306.

What is claimed is:

1. A carriage guide arrangement for use in a device for scanning a surface of a recording medium supported by a cylindrical drum, said arrangement comprising:
   a carriage capable of bidirectional linear movement along a path having at least a portion thereof parallel to said surface;
   an image transducing head mounted on said carriage;
   an enlongated first guide member extending in the direction of linear movement of said carriage,
      said carriage being bidirectionally rotatably and translatably mounted on said first guide member;
   a second guide member in juxtaposition with said first guide member for defining a first rotational position of said carriage in the region adjacent said record medium surface and a second rotational position of said carriage in the region beyond the ends of said drum;
   means for biasing said carriage toward said second guide member so that said carriage rotates between said first and second rotational positions as said carriage traverses the ends of said drum; and
   a carriage bearing member mounted on said carriage for engaging said second guide member to keep said transducing head at a desired distance from said record medium surface, corresponding to said first rotational position, between the ends of said drum, and for keeping said transducing head at said second rotational position beyond the ends of said drum.

2. A carriage guide mechanism for use in a scanning device as set forth in claim 1 wherein
   an air-tight cap is provided at a position at which said carriage is inclined about said first guide member toward an extended axis of said drum so that said air-tight cap may automatically and hermetically seal the transducing surface of said image transducing head.

* * * * *

UNITED STATES PATENT AND TRADEMARK OFFICE
CERTIFICATE OF CORRECTION

PATENT NO. : 4,227,219
DATED : Oct. 7, 1980
INVENTOR(S) : Takeshi Takemoto

It is certified that error appears in the above—identified patent and that said Letters Patent is hereby corrected as shown below:

On the title page, the filing date is incorrect:
   "Sep. 19, 1978" should be --Sep. 20, 1978--.

Column 4, line 57: "ends" should be --end--.

Column 5, lines 50-51: "magent" should be --magnet--.

Signed and Sealed this

Twenty-eighth Day of April 1981

[SEAL]

Attest:

RENE D. TEGTMEYER

Attesting Officer

Acting Commissioner of Patents and Trademarks